US011132265B2

(12) United States Patent
Cheng et al.

(10) Patent No.: US 11,132,265 B2
(45) Date of Patent: Sep. 28, 2021

(54) MULTI-REPLICA DATA RESTORATION METHOD AND APPARATUS

(71) Applicant: Huawei Technologies Co., Ltd., Guangdong (CN)

(72) Inventors: Guangwei Cheng, Shenzhen (CN); Bo Shang, Shenzhen (CN); Tian Qi, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 151 days.

(21) Appl. No.: 16/448,581

(22) Filed: Jun. 21, 2019

(65) Prior Publication Data

US 2019/0310922 A1 Oct. 10, 2019

Related U.S. Application Data

(63) Continuation of application No. PCT/CN2017/113212, filed on Nov. 27, 2017.

(30) Foreign Application Priority Data

Dec. 22, 2016 (CN) .......................... 201611201042.7

(51) Int. Cl.
*G06F 11/14* (2006.01)
*G06F 16/27* (2019.01)
*G06F 16/00* (2019.01)

(52) U.S. Cl.
CPC .......... *G06F 11/1469* (2013.01); *G06F 11/14* (2013.01); *G06F 11/1451* (2013.01);
(Continued)

(58) Field of Classification Search
CPC ...... G06F 11/14; G06F 11/1469; G06F 14/51; G06F 16/00; G06F 16/27; G06F 16/273
See application file for complete search history.

(56) References Cited

U.S. PATENT DOCUMENTS 7,921,267 B1 * 4/2011 Yadav ................ G06F 11/2082
 711/162
8,244,671 B2 * 8/2012 Chen ...................... G06F 16/10
 707/610
(Continued)

FOREIGN PATENT DOCUMENTS

CN 1454349 A 11/2003
CN 101369283 A 2/2009
(Continued)

OTHER PUBLICATIONS

Anonymous, "Raft algorithm for distributed systems," retrieved from the internet: https://www.jdon.com/artichect/raft.html on Aug. 13, 2019, 11 pgs.

(Continued)

*Primary Examiner* — Kamini B Patel
(74) *Attorney, Agent, or Firm* — Womble Bond Dickinson (US) LLP (57) ABSTRACT

Embodiments of this application provide a method and an apparatus for multi-replica data restoration. The method is applied to a distributed database and includes: when a first page in replica data of a first node has a fault, obtain N latest LSNs in data log information of a second node that corresponds to a first page identifier. The first page is any page that is in the replica data of the first node and that has a fault. The first node further determines a node corresponding to a largest LSN in the N latest LSNs in the data log information of the second node that corresponds to the first page identifier is a third node. Then the first node performs data restoration on the first page in the replica data of the first node according to replica data of the third node.

20 Claims, 7 Drawing Sheets

(52) U.S. Cl.
CPC ............ *G06F 16/00* (2019.01); *G06F 16/273* (2019.01); *G06F 2201/80* (2013.01); *G06F 2201/82* (2013.01)

(56) References Cited

U.S. PATENT DOCUMENTS

| | | | | |
|---|---|---|---|---|
| 8,645,319 | B2* | 2/2014 | Iwaki | G06F 16/2358 |
| | | | | 707/610 |
| 8,768,891 | B2* | 7/2014 | Schreter | G06F 16/00 |
| | | | | 707/682 |
| 9,098,676 | B2* | 8/2015 | Elteto | G06F 21/57 |
| 9,268,659 | B2* | 2/2016 | Kapoor | G06F 11/1458 |
| 9,449,038 | B2* | 9/2016 | Gupta | G06F 16/245 |
| 10,067,952 | B2* | 9/2018 | Ahrens | G06F 16/273 |
| 10,762,107 | B2* | 9/2020 | Florendo | G06F 16/273 |
| 2002/0116404 | A1* | 8/2002 | Cha | G06F 11/1471 |
| 2007/0038682 | A1* | 2/2007 | Kulesza | G06F 11/1469 |
| 2009/0157766 | A1* | 6/2009 | Shen | G06F 11/2041 |
| 2011/0283045 | A1* | 11/2011 | Krishnan | G06F 9/544 |
| | | | | 711/102 |
| 2014/0279930 | A1* | 9/2014 | Gupta | G06F 11/1471 |
| | | | | 707/683 |
| 2014/0324785 | A1* | 10/2014 | Gupta | G06F 16/2365 |
| | | | | 707/689 |
| 2015/0237127 | A1* | 8/2015 | Khemani | G06F 16/2282 |
| | | | | 707/625 |
| 2016/0321145 | A1* | 11/2016 | Fang | G06F 11/1471 |
| 2019/0079682 | A1* | 3/2019 | Bikumala | G06F 11/1466 |
| 2019/0377821 | A1* | 12/2019 | Pleshachkov | G06F 16/273 |
| 2020/0293407 | A1* | 9/2020 | Depoutovitch | G06F 11/2094 |

FOREIGN PATENT DOCUMENTS

| | | |
|---|---|---|
| CN | 102156720 A | 8/2011 |
| CN | 101243446 A | 8/2012 |
| CN | 101243446 B | 8/2012 |
| CN | 102693324 A | 9/2012 |
| CN | 103150267 A | 6/2013 |
| CN | 103795754 A | 5/2014 |
| CN | 104281506 A | 1/2015 |
| CN | 105183581 A | 12/2015 |
| CN | 105190622 A | 12/2015 |
| CN | 105550306 A | 5/2016 |
| CN | 105608143 A | 5/2016 |

OTHER PUBLICATIONS

Anonymous, Raft algorithm for distributed systems, retrieved from the internet: https://www.jdon.com/artichect/raft.html on Aug. 13, 2019. total 11 pages.

* cited by examiner

MULTI-REPLICA DATA RESTORATION METHOD AND APPARATUS

CROSS-REFERENCE TO RELATED APPLICATIONS

This application is a continuation of International Application No. PCT/CN2017/113212, filed on Nov. 27, 2017, which claims priority to Chinese Patent Application No. 201611201042.7, filed on Dec. 22, 2016. The disclosures of the aforementioned applications are incorporated herein by reference in their entireties.

TECHNICAL FIELD

This application relates to the field of database technologies, and in particular, to a multi-replica data restoration method and an apparatus.

BACKGROUND

In a distributed database, data of each node may be stored in a form of multi-replica data. Each piece of replica data is the same as primary data, and each piece of replica data may provide a data read-only capability. This is applicable to a scenario such as an Internet service with more reads than writes.

Currently, when a database system checks multi-replica data, the database system needs to retain a recorded data transaction log if finding that a piece of replica data among a plurality of pieces of replica data has a fault, that is, a node storing the piece of replica data becomes faulty. Then, starting from a fault source of the piece of replica data, the node performs log replay on the piece of replica data according to the recorded data transaction log, to implement data restoration of the piece of replica data.

However, when a downtime of the node is relatively long, a large quantity of data transaction logs accumulate, and log replay that starts to be performed from the fault source according to the data transaction logs is also time-consuming, resulting in relatively low data restoration efficiency. In addition, when a large quantity of data transaction logs are retained, a large amount of storage space of the database system is occupied, increasing storage pressure.

SUMMARY

Embodiments of this application provide a multi-replica data restoration method and an apparatus, to resolve a prior-art problem that: when replica data has a fault, a data restoration time is long, and data restoration efficiency is low. In addition, there is no need to retain a large quantity of data transaction logs in this application, reducing storage pressure of a database.

To achieve the foregoing objective, the following technical solutions are used in the embodiments of this application.

According to a first aspect, a multi-replica data restoration method is provided, and is applied to a distributed database, where the distributed database includes N nodes, and each node stores replica data and data log information; the data log information stored on each node includes information about a correspondence between a page identifier and N latest log sequence numbers (LSNs), the N latest LSNs are in a one-to-one correspondence to the N nodes, and N is an integer greater than or equal to 2; and the method includes: if a first page in replica data of a first node has a fault, obtaining, by the first node, N latest LSNs in data log information of a second node that are corresponding to a first page identifier, where the second node is in the N nodes and is not faulty, and the first page is any page that is in the replica data of the first node and that has a fault; determining, by the first node according to the N latest LSNs in the data log information of the second node that are corresponding to the first page identifier, that a node corresponding to a largest LSN in the N latest LSNs is a third node; and performing, by the first node, data restoration on the first page in the replica data of the first node according to replica data of the third node.

In the foregoing technical solution, if the first page in the replica data of the first node has a fault, where the first page is any page that is in the replica data of the first node and that has a fault, the first node determines the third node according to the N latest LSNs in the data log information of the second node that are corresponding to the first page identifier, where the second node is not faulty, and the replica data of the third node is latest replica data. Then, the first node performs data restoration on the first page in the replica data of the first node according to the latest replica data, thereby reducing a data restoration time and improving data restoration efficiency. In addition, corresponding data transaction logs do not need to be retained during data restoration, reducing storage pressure of the database.

In one embodiment, after the performing, by the first node, data restoration on the first page in the replica data of the first node according to replica data of the third node, the method further includes: updating, by the first node, data log information of the first node according to the N latest LSNs in the data log information of the second node that are corresponding to the first page identifier. In the foregoing technical solution, the first node updates the data log information of the first node after data restoration. This can ensure accuracy and freshness of the data log information of the first node.

In one embodiment, after the performing, by the first node, data restoration on the first page in the replica data of the first node according to replica data of the third node, the method further includes: sending, by the first node, a restored first page to other faulty nodes different from the first node that are in the N nodes, so that each faulty node of the other faulty nodes updates replica data of the faulty node according to the first page. In the foregoing technical solution, the other faulty nodes may perform data restoration by using the first page sent by the first node. In this way, a plurality of faulty nodes implement quick restoration of first pages, and data restoration efficiency is further improved.

In one embodiment, after the performing, by the first node, data restoration on the first page in the replica data of the first node according to replica data of the third node, the method further includes: obtaining, by the first node, a second page in the replica data of the third node, and updating the replica data of the first node according to the second page, where the second page is any page updated in a fault rectification process of the first page. In the foregoing technical solution, the first node may update the replica data of the first node according to the second page. In this case, after fault rectification, data restoration efficiency is further improved, and storage pressure of the database is reduced.

In one embodiment, the data log information further includes information about a correspondence between a third page identifier and N latest LSNs, and the method further includes: when the N latest LSNs corresponding to the third page identifier meet a preset deletion condition, deleting, by the first node, the information about the correspondence between the third page identifier and the N latest LSNs from the data log information of the first node. In the foregoing technical solution, the first node deletes the information about the correspondence between the third page identifier and the N latest LSNs from the data log information of the first node, thereby releasing specific storage space and reducing storage pressure.

In one embodiment, the method further includes: if the replica data of the first node has no fault, when there are update operations on first pages in replica data of the N nodes, determining, by the first node, the N latest LSNs corresponding to the first page identifier; and updating, by the first node, data log information of the first node according to the first page identifier and the N latest LSNs. In the foregoing technical solution, the first node determines the N latest LSNs corresponding to the first page identifier in real time and updates the data log information, thereby ensuring accuracy and freshness of the data log information.

In one embodiment, if the replica data of the first node has no fault, the first node detects, in N latest LSNs in data log information of the first node that are corresponding to a fourth page identifier, whether there is at least one latest LSN that meets a preset fault condition; and when the preset fault condition is met, the first node determines that a node corresponding to the at least one latest LSN is a faulty node, and a fourth page in replica data of the faulty node has a fault.

In one embodiment, the preset fault condition includes: the at least one latest LSN is different from another latest LSN in the N latest LSNs corresponding to the fourth page identifier, and a difference between the at least one latest LSN and the other latest LSN is greater than or equal to a preset threshold; or a quantity of the latest LSNs corresponding to the fourth page identifier is less than N.

In the foregoing technical solutions, the first node may determine, according to the data log information of the first node and the preset fault condition, a faulty node and a page that is in replica data of the faulty node and that has a fault, thereby improving efficiency in determining a faulty node and determining a page that has a fault.

According to a second aspect, a first node is provided, and is applied to a distributed database, where the distributed database includes N nodes, and each node stores replica data and data log information; the data log information stored on each node includes information about a correspondence between a page identifier and N latest log sequence numbers LSNs, the N latest LSNs are in a one-to-one correspondence to the N nodes, and N is an integer greater than or equal to 2; and the first node includes: an obtaining unit, configured to: if a first page in replica data of the first node has a fault, obtain N latest LSNs in data log information of a second node that are corresponding to a first page identifier, where the first page is any page that is in the replica data of the first node and that has a fault, and the second node is a node in the N nodes that is not faulty; a determining unit, configured to determine a third node according to the N latest LSNs in the data log information of the second node that are corresponding to the first page identifier, where the third node is a node corresponding to a largest LSN in the N latest LSNs; and a restoration unit, configured to perform data restoration on the first page in the replica data of the first node according to replica data of the third node.

In one embodiment, the restoration unit is further configured to update data log information of the first node according to the N latest LSNs in the data log information of the second node that are corresponding to the first page identifier.

In one embodiment, the first node further includes a sending unit, configured to send a restored first page to other faulty nodes different from the first node that are in the N nodes, so that each faulty node of the other faulty nodes updates replica data of the faulty node according to the first page.

In one embodiment, the obtaining unit is further configured to obtain a second page in the replica data of the third node; and the restoration unit is further configured to update the replica data of the first node according to the second page, where the second page is any page updated in a fault rectification process of the first page.

In one embodiment, the data log information further includes information about a correspondence between a third page identifier and N latest LSNs, and the first node further includes a deletion unit, configured to: when the N latest LSNs corresponding to the third page identifier meet a preset deletion condition, delete the information about the correspondence between the third page identifier and the N latest LSNs from the data log information of the first node.

In one embodiment, the determining unit is further configured to: if the replica data of the first node has no fault, when there are update operations on first pages in replica data of the N nodes, determine the N latest LSNs corresponding to the first page identifier; and the restoration unit is further configured to update data log information of the first node according to the first page identifier and the N latest LSNs.

In one embodiment, the first node further includes a detection unit, configured to: if the replica data of the first node has no fault, detect, in N latest LSNs in data log information of the first node that are corresponding to a fourth page identifier, whether there is at least one latest LSN that meets a preset fault condition; and the determining unit is further configured to: when the preset fault condition is met, determine that a node corresponding to the at least one latest LSN is a faulty node, and a fourth page in replica data of the faulty node has a fault.

In one embodiment, the preset fault condition includes: the at least one latest LSN is different from another latest LSN in the N latest LSNs corresponding to the fourth page identifier, and a difference between the at least one latest LSN and the other latest LSN is greater than or equal to a preset threshold; or a quantity of the latest LSNs corresponding to the fourth page identifier is less than N.

According to a third aspect, a first node is provided. The first node includes a processor and a memory. The memory stores code and data. The processor may execute the code in the memory, and the processor is configured to execute the multi-replica data restoration method provided in any one of the first aspect or the possible implementations of the first aspect.

According to a fourth aspect, a computer-non-transitory computer-readable medium is provided. The computer-non-transitory computer-readable medium stores a computer-executable instruction. When at least one processor of a device executes the computer-executable instruction, the device executes the multi-replica data restoration method provided in any one of the first aspect or the possible implementations of the first aspect.

According to a fifth aspect, a computer program product is provided. The computer program product includes a computer-executable instruction. The computer-executable instruction is stored in a computer-non-transitory computer-readable medium. At least one processor of a device may read the computer-executable instruction from the computer-non-transitory computer-readable medium, and the at least one processor executes the computer-executable instruction, so that the device implements the multi-replica data restoration method provided in any one of the first aspect or the possible implementations of the first aspect.

DESCRIPTION OF EMBODIMENTS

The following describes the technical solutions in the embodiments of this application with reference to the accompanying drawings in the embodiments of this application. Apparently, the described embodiments are merely some but not all of the embodiments of this application.

The phrase "a plurality of" in this specification represents two or more. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

Figure 1:
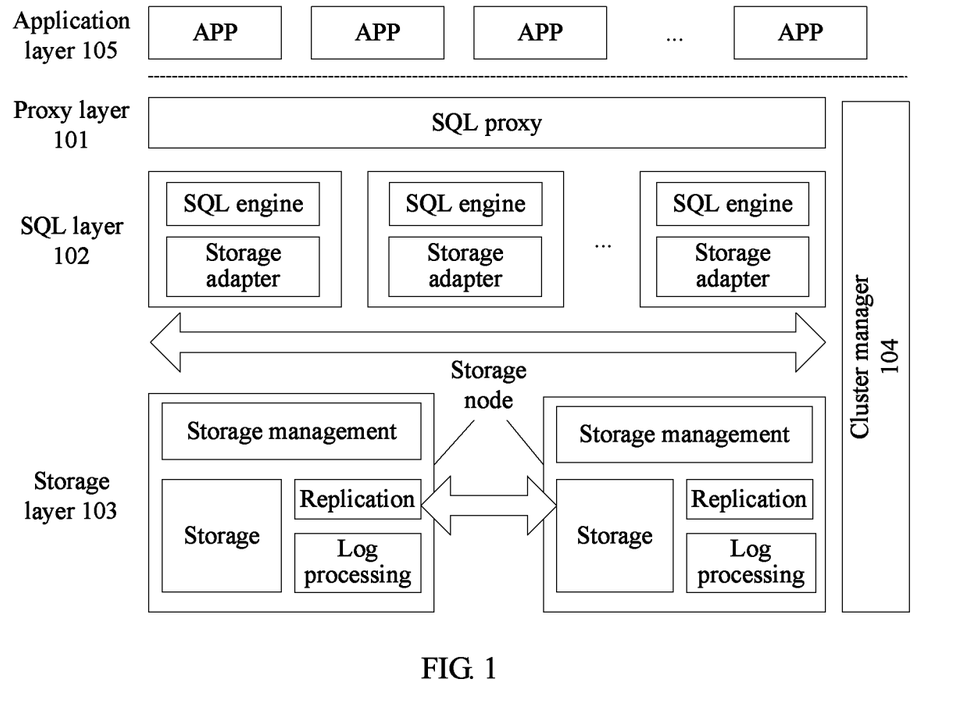
FIG. 1 is a schematic structural diagram of a distributed database according to an embodiment of this application.

FIG. 1 is a schematic structural diagram of a distributed database according to an embodiment of this application. Referring to FIG. 1, the distributed database includes a proxy layer 101, an SQL layer 102, a storage layer 103, a cluster manager 104, and an application layer 105 that runs above the proxy layer 101. The application layer 105 includes one or more applications (APP). The proxy layer 101 has functions of sharding, transparent access, read or write isolation, and load balancing. The SQL layer 102 may include a plurality of SQL nodes, and each SQL node may include an SQL engine and a storage adapter. The SQL engine has functions such as SQL parsing and transaction concurrency control. The storage adapter has functions such as storage layer interface adaptation and router access. The storage layer 103 may include a plurality of storage nodes. Each storage node may be configured to store replica data, and the plurality of storage nodes may include a primary node and at least one secondary node. The storage layer 103 further has functions such as request processing and distribution, log sequence number (LSN) order-preserving control, and management and maintenance command processing. The storage layer 103 further has functions such as implementing synchronous/asynchronous data replication among a plurality of pieces of replica data by using a replication protocol, maintaining a database state machine, processing a restoration log generated by a write node, and providing an asynchronous page and a corresponding page reading service. The cluster manager 104 has functions such as cluster management, software start and stop, fault monitoring and processing, and active/standby arbitration for selecting a primary node from the plurality of storage nodes.

Figure 2:
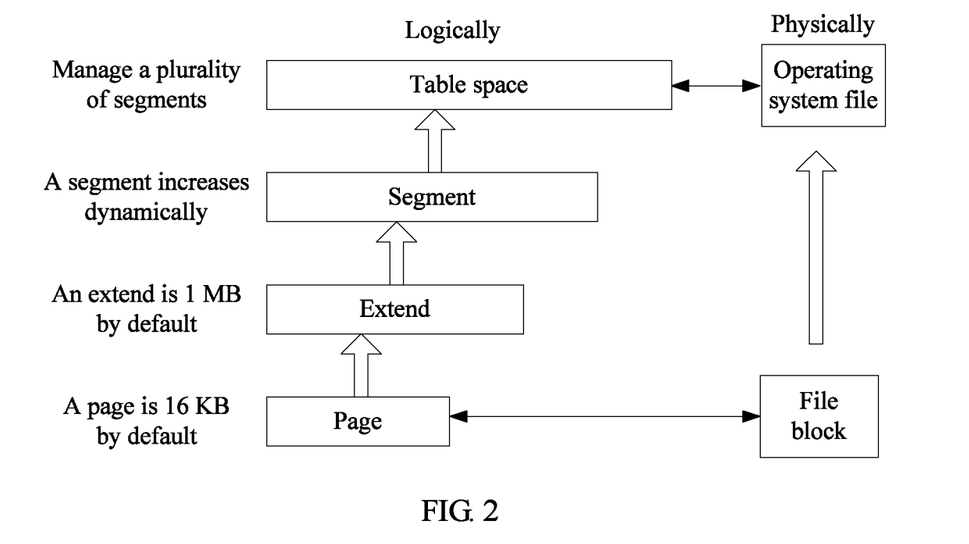
FIG. 2 is a schematic diagram of data storage in a database according to an embodiment of this application.

FIG. 2 is a schematic diagram of data storage in a database according to an embodiment of this application. Referring to FIG. 2, data in a database is ultimately stored in a form of a page, and all data in the database may be regarded as a set of pages of specified data. In one embodiment, in logical storage, a plurality of pages may form an extend. For example, an extend may include 1 MB, that is, include 64 pages, and each page includes 16 KB. One or more extends may form a segment. A segment increases dynamically, and a plurality of segments may form a table space. In physical storage, a page corresponds to a file block, and a table space corresponds to an operating system file (OS).

Figure 3:
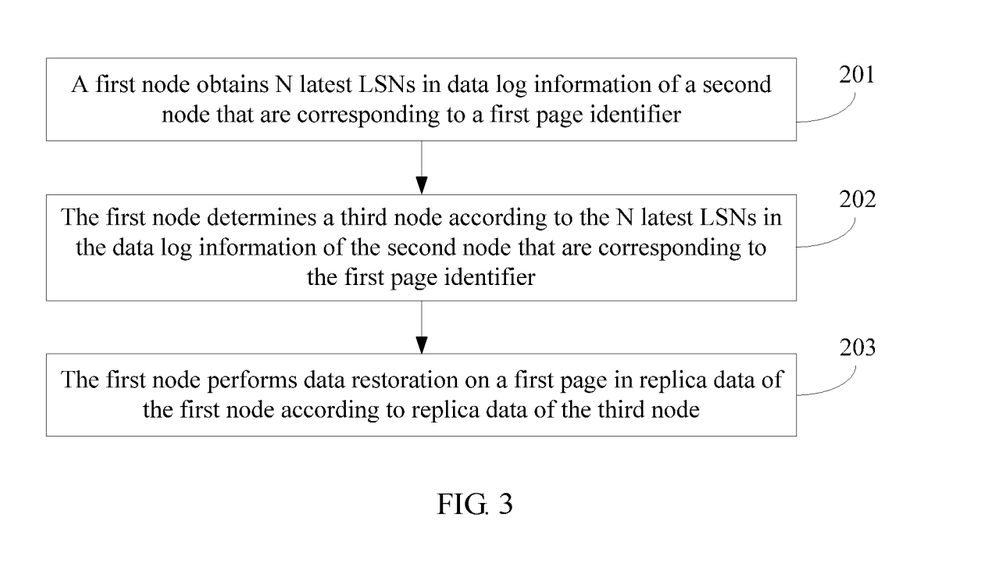
FIG. 3 is a flowchart of a multi-replica data restoration method according to an embodiment of this application.

FIG. 3 is a flowchart of a multi-replica data restoration method according to an embodiment of this application. Referring to FIG. 3, the method is applied to a distributed database, for example, applied to the distributed database shown in FIG. 1. The distributed database includes N nodes, and each node stores replica data and data log information. The data log information stored on each node includes information about a correspondence between a page identifier and N latest LSNs. The N latest LSNs are in a one-to-one correspondence to the N nodes. N is an integer greater than or equal to 2. The method may include the following steps.

Step 201: If a first page in replica data of a first node has a fault, the first node obtains N latest LSNs in data log information of a second node that are corresponding to a first page identifier, where the first page in the replica data of the first node is any page that is in the replica data of the first node and that has a fault, and the second node is a node in the N nodes that is not faulty.

The N nodes included in the distributed database may be the N storage nodes at the storage layer shown in FIG. 1. Replica data stored on each of the N nodes may include one or more pages. Each node may update a page in the replica data stored on the node. When each node is performing an update operation, a corresponding data transaction log is recorded. Each data transaction log is corresponding to one LSN. A plurality of update operations are performed on a same page in succession. LSNs of data transaction logs corresponding to the plurality of update operations are incremental. In this application, an LSN of a data transaction log corresponding to a latest update operation on a page is referred to as a latest LSN. An update operation indicates a modification to replica data, for example, addition, deletion, or replacement. If a page has changed, an update operation has been performed on the page.

Data log information includes information about a correspondence between a page identifier and N latest LSNs. The N latest LSNs are in a one-to-one correspondence to the N nodes. In other words, each of the N latest LSNs is a latest LSN corresponding to one node in the N nodes. The data log information may include one or more page identifiers, and each page identifier is corresponding to N latest LSNs.

For example, if the N nodes are three nodes: a node 1, a node 2, and a node 3, the data log information includes a first page identifier, and the first page identifier is ID 1, information that is about a correspondence between the first page identifier and N latest LSNs and that is included in the data log information may be shown in Table 1. In Table 1, a latest LSN corresponding to the node 1 is represented as LSN (1), a latest LSN corresponding to the node 2 is represented as LSN (2), and a latest LSN corresponding to the node 3 is represented as LSN (3).

TABLE 1

| Page identifier | N latest LSNs |
| --- | --- |
| ID 1 | LSN (1) |
|  | LSN (2) |
|  | LSN (3) |

It should be noted that an arrangement order of the latest LSNs, in Table 1, corresponding to the N nodes may be preset. In this embodiment of this application, description is made by using the information, shown in Table 1, about the correspondence between the first page identifier and the N latest LSNs as an example. Table 1 does not constitute a limitation on this embodiment of this application.

In one embodiment, when the replica data of the first node has a fault, data log information of the first node is no longer updated. The second node is a node in the N nodes that is not faulty, and the data log information of the second node may be updated in real time. Therefore, when a first page in the replica data of the first node has a fault, the first node may obtain the N latest LSNs in the data log information of the second node that are corresponding to the first page identifier.

In one embodiment, the second node may be a primary node in the N nodes. Data log information of the primary node is latest data log information. For example, the second node may be a primary node in a Raft consensus protocol.

For example, when the first page in the replica data of the first node has a fault, the first node may send an information obtaining request to the second node. The information obtaining request includes the first page identifier ID 1. When the second node receives the information obtaining request, the second node may obtain, according to the first page identifier ID 1, N latest LSNs corresponding to ID 1 from the data log information, shown in Table 2, of the second node. The second node sends the obtained N latest LSNs to the first node, so that the first node obtains the N latest LSNs in the data log information of the second node that are corresponding to the first page identifier. In Table 2, a latest LSN corresponding to the node 1 is LSN-E, a latest LSN corresponding to the node 2 is LSN-X, and a latest LSN corresponding to the node 3 is LSN-Y.

TABLE 2

| Page identifier | N latest LSNs |
| --- | --- |
| ID 1 | LSN-E |
|  | LSN-X |
|  | LSN-Y |

It should be noted that information, shown in Table 2, about a correspondence between the first page identifier and the N latest LSNs, and the N latest LSNs are merely examples. Table 2 does not constitute a limitation on this embodiment of this application.

Step 202: The first node determines a third node according to the N latest LSNs in the data log information of the second node that are corresponding to the first page identifier, where the third node is a node corresponding to a largest LSN in the N latest LSNs.

When the N nodes perform corresponding update operations on first pages in replica data stored on the N nodes, there is a specific difference among operation speeds of the N nodes. Some nodes operate at a low speed, and some nodes operate at a high speed. In this case, a latest LSN corresponding to a node with a high operation speed is relatively large, and a latest LSN corresponding to a node with a low operation speed is relatively small. Therefore, when the first node obtains the N latest LSNs in the data log information of the second node that are corresponding to the first page identifier, the first node may determine that the node corresponding to the largest LSN in the obtained N latest LSNs is the third node.

For example, as shown in Table 2, when the first node learns that the latest LSNs, which are of the three nodes and corresponding to the first page identifier ID 1, in the data log information of the second node are LSN-E, LSN-X, and LSN-Y, if the first node determines that the largest LSN in the three latest LSNs is LSN-Y, the first node may determine that the node 3 is the third node.

It should be noted that the third node and the second node may be the same or different. When the node corresponding to the largest LSN in the N latest LSNs obtained by the first node is the second node, the third node and the second node are the same. When the node corresponding to the largest LSN in the N latest LSNs obtained by the first node is not the second node, the third node and the second node are different.

Step 203: The first node performs data restoration on a first page in the replica data of the first node according to replica data of the third node.

In the N latest LSNs corresponding to the first page identifier that are obtained by the first node, a latest LSN corresponding to the third node is the largest, that is, the replica data of the third node is latest replica data. In this way, the first node can perform data restoration on the first page in the replica data of the first node according to the replica data of the third node.

In one embodiment, the first node may send a page obtaining request to the third node. The page obtaining request includes the first page identifier. When the third node receives the page obtaining request, the third node may obtain a first page in the replica data of the third node according to the first page identifier, and send the obtained first page to the first node, so that the first node may replace the first page in the replica data of the first node according to the received first page, to implement data restoration of the first page.

In this embodiment of this application, if the first page in the replica data of the first node has a fault, where the first page is any page that is in the replica data of the first node and that has a fault, the first node may determine the third node according to the N latest LSNs in the data log information of the second node that are corresponding to the first page identifier, where the second node is not faulty. The replica data of the third node is the latest replica data, and the first node performs data restoration on the first page in the replica data of the first node according to the latest replica data. Compared with a prior-art method for performing, by using log replay, data restoration on replica data that has a fault, in this application, there is no need to consume a large amount of time for log replay, thereby reducing a data restoration time and improving data restoration efficiency. In addition, compared with the prior art, in this embodiment of this application, corresponding data transaction logs do not need to be retained during data restoration, thereby reducing storage pressure of the database.

Figure 4:
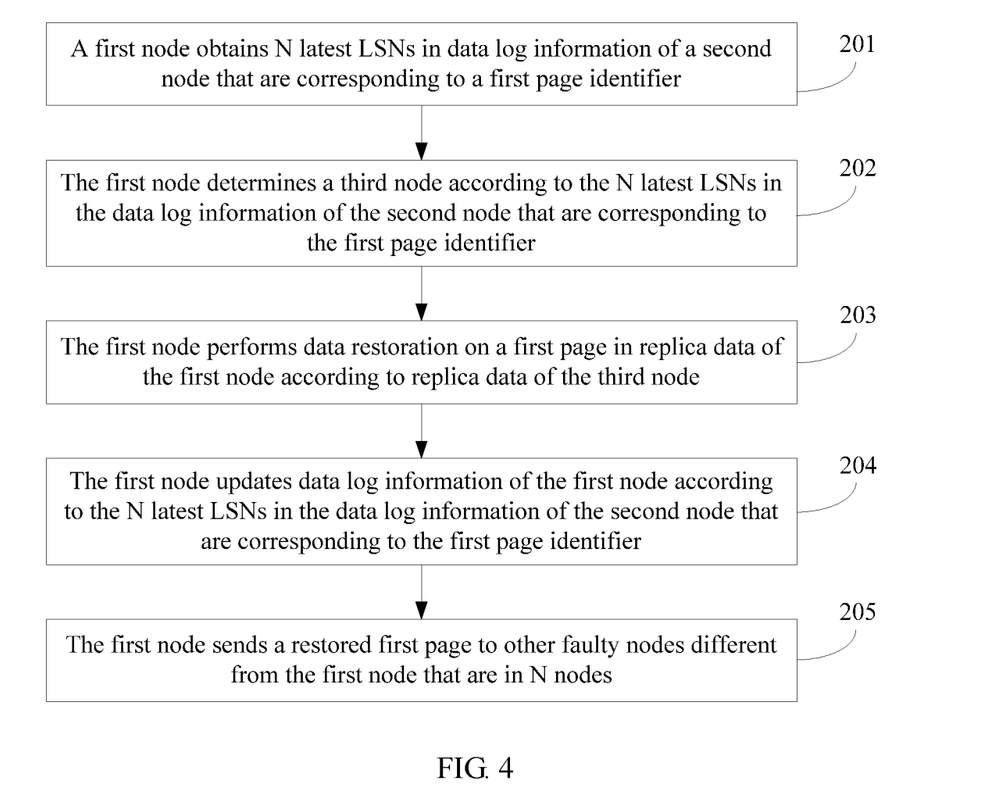
FIG. 4 is a flowchart of another multi-replica data restoration method according to an embodiment of this application.

Further, referring to FIG. 4, after step 203, the method further includes step 204.

Step 204: The first node updates data log information of the first node according to the N latest LSNs in the data log information of the second node that are corresponding to the first page identifier.

After the first node performs data restoration on the first page in the replica data of the first node, the first node may further update a latest LSN, which is of another N−1 node and corresponding to the first page identifier, in the data log information of the first node according to a latest LSN, which is of the other N−1 node in the N nodes and corresponding to the first page identifier, in the data log information of the second node, and updates a latest LSN of the first node to the largest LSN, that is, the latest LSN corresponding to the third node, to update the data log information of the first node.

For example, after the first node updates the data log information of the first node according to the information, shown in Table 2, that is about the correspondence between the first page identifier and the N latest LSNs and that is in the data log information of the second node, information that is about a correspondence between the first page identifier and N latest LSNs and that is in the data log information of the first node is shown in Table 3.

TABLE 3

| Page identifier | N latest LSNs |
|---|---|
| ID 1 | LSN-Y |
|  | LSN-X |
|  | LSN-Y |

In this embodiment of this application, the first node may update the data log information of the first node according to the N latest LSNs in the data log information of the second node that are corresponding to the first page identifier. This can ensure accuracy and freshness of the data log information of the first node.

Further, after step 203, the method further includes step 205. Step 204 may be performed before or after step 205.

Step 205: The first node sends a restored first page to other faulty nodes different from the first node that are in the N nodes, so that each faulty node of the other faulty nodes updates replica data of the faulty node according to the first page.

When first pages in replica data of at least two nodes in the N nodes have a fault, that is, there are at least two faulty nodes in the N nodes, the first node may perform data restoration on the first page in the replica data of the first node according to the replica data of the third node, and send the restored first page to each of the other faulty nodes in the at least two faulty nodes, so that each faulty node updates a first page in replica data of the faulty node according to the first page. In this way, a plurality of faulty nodes implement quick restoration of first pages, and data restoration efficiency is further improved.

In one embodiment, after step 205, the other faulty nodes may also update their respective data log information according to the method in step 204, so that accuracy and freshness of data log information of each faulty node are ensured after data restoration.

Figure 5:
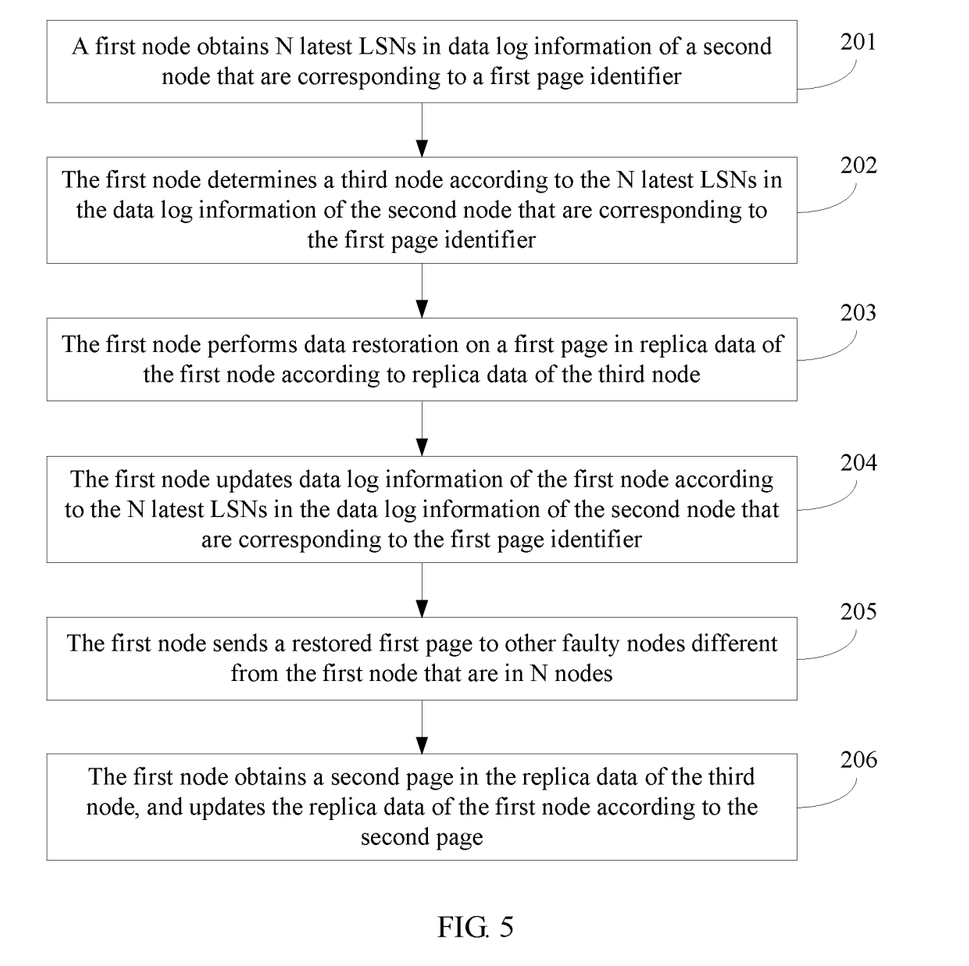
FIG. 5 is a flowchart of still another multi-replica data restoration method according to an embodiment of this application.

Further, referring to FIG. 5, after step 203, the method further includes step 206. Step 206 may be performed before or after step 204 and step 205.

Step 206: The first node obtains a second page in the replica data of the third node, and updates the replica data of the first node according to the second page, where the second page is any page updated in a fault rectification process of the first page.

In a process in which the first node performs data restoration on the first page in the replica data of the first node, another node in the N nodes that is not faulty may update a second page in corresponding replica data. Consequently, progresses of update operations on replica data of the N nodes may be different. When an update operation progress of the other node that is not faulty is greater than or equal to a page, to make the first node keep up with the other node that is not faulty as soon as possible after completing data restoration, the first node may obtain the second page in the replica data of the third node, and update a second page in the replica data of the first node according to the second page in the replica data of the third node. The second page is the any page updated, by the other node that is not faulty, in the process in which the first node performs data restoration on the first page.

In one embodiment, when the first node determines that a data restoration time of the first page is greater than or equal to a transmission time of a page, the first node may determine that the update operation progress of the other node that is not faulty is greater than or equal to a page.

In this embodiment of this application, after performing data restoration on the first page in the replica data of the first node, the first node may obtain the second page in the replica data of the third node, and update the replica data of the first node according to the second page. In this case, after fault rectification, data restoration efficiency of the first node is further improved, and storage pressure of the database is reduced.

In one embodiment, after step 206, the first node may also update the data log information of the first node according to the method in step 204, to keep accuracy and freshness of the data log information of the first node.

Figure 6:
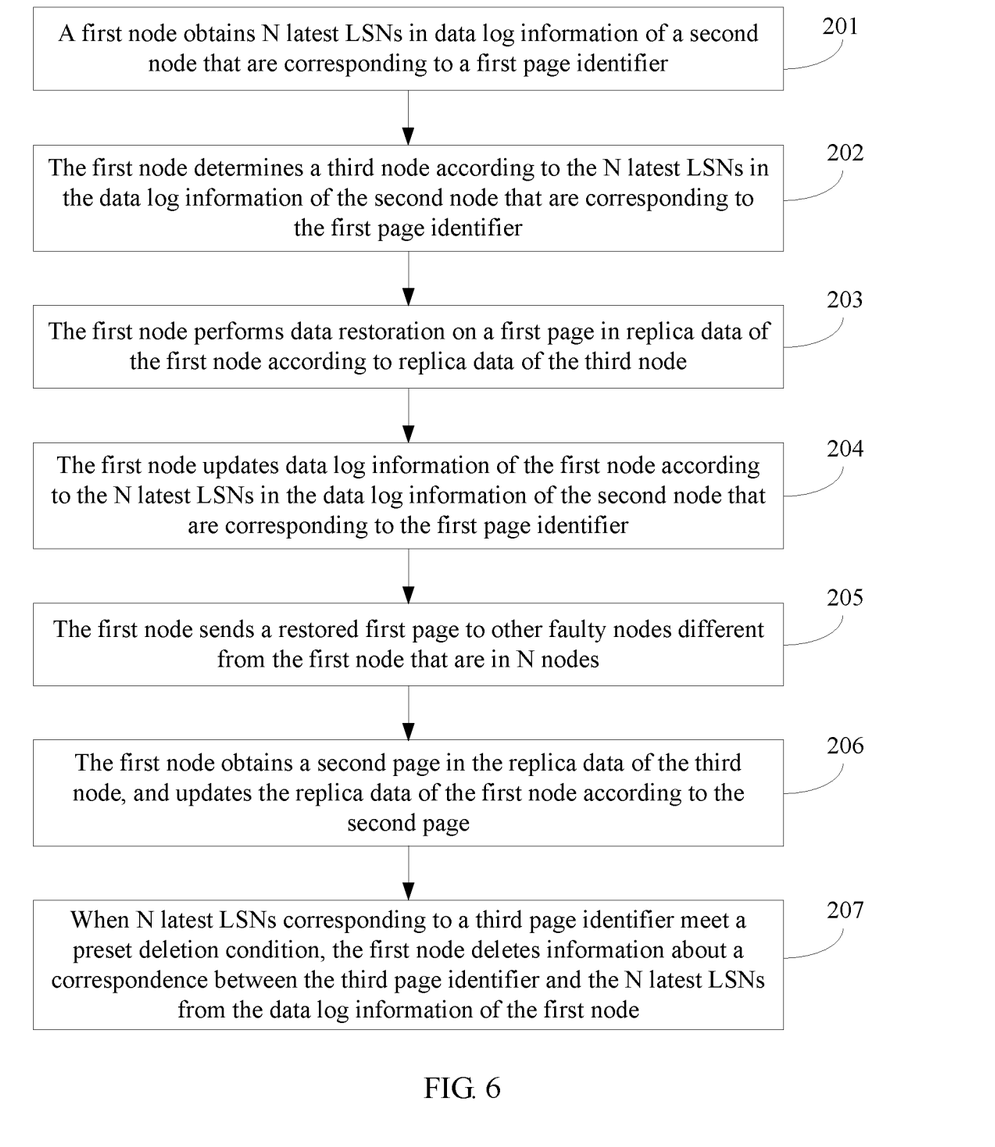
FIG. 6 is a flowchart of yet another multi-replica data restoration method according to an embodiment of this application.

Further, referring to FIG. 6, if the data log information further includes information about a correspondence between a third page identifier and N latest LSNs, the method further includes step 207. Step 207 may be performed before or after step 201 to step 206.

Step 207: When N latest LSNs corresponding to a third page identifier meet a preset deletion condition, the first node deletes information about a correspondence between the third page identifier and the N latest LSNs from the data log information of the first node.

When the N latest LSNs, corresponding to the third page identifier, in the data log information are the same, and a difference between the N latest LSNs and last N latest LSNs that are corresponding to the third page identifier is less than a specified threshold, it can be determined that the N latest LSNs corresponding to the third page identifier meet the preset deletion condition, so that the first node may delete the information about the correspondence between the third page identifier and the N latest LSNs from the data log information of the first node.

It should be noted that each of the N nodes may delete the information about the correspondence between the third page identifier and the N latest LSNs from corresponding data log information according to step 207. In addition, the specified threshold may be preset. For example, the specified threshold may be 100 MB.

In this embodiment of this application, when the N latest LSNs corresponding to the third page identifier meet the preset deletion condition, the first node may delete the information about the correspondence between the third page identifier and the N latest LSNs from the data log information of the first node, to release specific storage space and reduce storage pressure.

Figure 7:
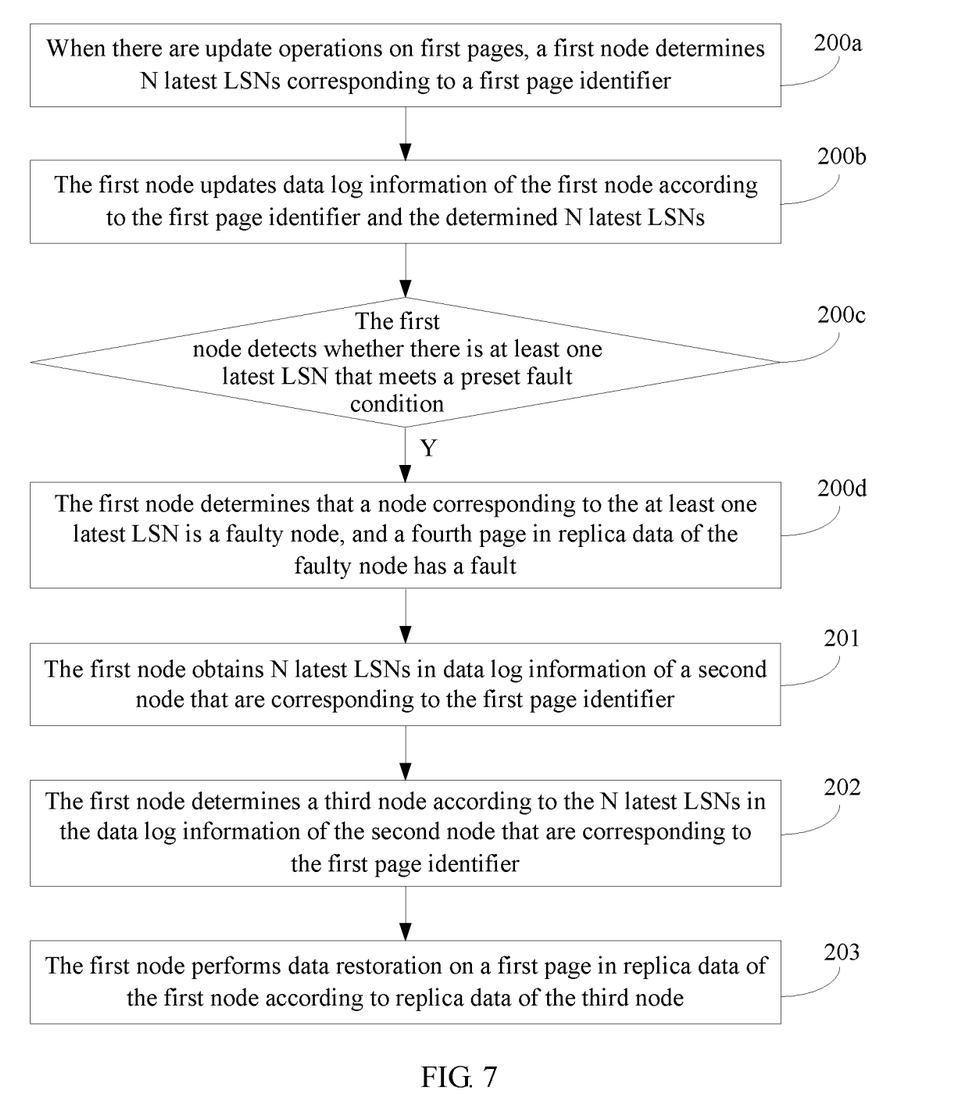
FIG. 7 is a flowchart of still yet another multi-replica data restoration method according to an embodiment of this application.

Further, referring to FIG. 7, if the replica data of the first node has no fault, that is, before the replica data of the first node has a fault or after data restoration for a fault, the method further includes step 200a and step 200b. In FIG. 7, an example in which step 200a and step 200b are performed before step 201 is used for description, that is, step 200a and step 200b are performed before the replica data of the first node has a fault.

Step 200a: When there are update operations on first pages in replica data of the N nodes, the first node determines the N latest LSNs corresponding to the first page identifier.

In a process in which update operations are performed on the first pages in the replica data of the N nodes, each of the N nodes performs an update operation on a first page in corresponding replica data, that is, a corresponding LSN is generated. The first node determines, according to an update operation of the first node, a latest LSN that is of the first node and that is corresponding to the first data identifier. In addition, other nodes of the N nodes may send their latest LSNs corresponding to the first data identifier to the first node, so that the first node may determine the N latest LSNs corresponding to the first page identifier.

Step 200b: The first node updates the data log information of the first node according to the first page identifier and the determined N latest LSNs.

If the data log information includes the first page identifier, the first node may update, to the currently determined N latest LSNs according to the first page identifier, N latest LSNs in the data log information of the first node that are corresponding to the first page identifier, to update the data log information of the first node. Alternatively, if the data log information does not include the first page identifier, the first node adds the first page identifier and the currently determined N latest LSNs to information that is about a correspondence between a page identifier and N latest LSNs and that is included in the data log information, so as to update the data log information of the first node.

In this embodiment of this application, the first node that is not faulty may update the data log information of the first node in real time according to the determined N latest LSNs corresponding to the first page identifier, and each of the other nodes of the N nodes may also update corresponding data log information, to ensure accuracy and freshness of the data log information.

Further, if the replica data of the first node has no fault, the method further includes step 200c and step 200d. Step 200c and step 200d may be performed before or after step 200a and step 200b. In FIG. 7, an example in which step 200c and step 200d are performed after step 200a and step 200b and before step 201 is used for description.

Step 200c: The first node detects, in N latest LSNs in the data log information of the first node that are corresponding to a fourth page identifier, whether there is at least one latest LSN that meets a preset fault condition.

The preset fault condition includes: The at least one latest LSN is different from another latest LSN in the N latest LSNs corresponding to the fourth page identifier, and a difference between the at least one latest LSN and the other latest LSN is greater than or equal to a preset threshold; or a quantity of the latest LSNs corresponding to the fourth page identifier is less than N.

The at least one latest LSN includes one or more latest LSNs. The first node is not faulty, so a node corresponding to the at least one latest LSN does not include the first node. Therefore, the first node may detect, in the N latest LSNs in the data log information of the first node that are corresponding to the fourth page identifier, whether there is at least one latest LSN that meets the preset fault condition, to detect whether at least one of the N nodes is faulty. The fourth page identifier indicates any page in the replica data.

For example, the N nodes are a node 1, a node 2, and a node 3, and the fourth page identifier is ID 4. Table 4 shows information that is about a correspondence between the fourth page identifier and the N latest LSNs and that is in the data log information of the first node. In Table 4, a quantity of the latest LSNs corresponding to ID 4 is 2, which is less than 3, a quantity of the N nodes. Then, the first node determines that a latest LSN of the second node meets the preset fault condition.

TABLE 4

| Page identifier | N latest LSNs |
|---|---|
| ID 4 | LSN-H |
|  | None |
|  | LSN-H |

It should be noted that the information, shown in Table 4, about the correspondence between the fourth page identifier and the N latest LSNs, and the N latest LSNs are merely examples. Table 4 does not constitute a limitation on this embodiment of this application.

Step 200d: When the preset fault condition is met, the first node determines that a node corresponding to the at least one latest LSN is a faulty node, and a fourth page in replica data of the faulty node has a fault.

When the first node determines that at least one of the N latest LSNs corresponding to the fourth page identifier meets the preset fault condition, the first node may determine that the node corresponding to the at least one latest LSN is a faulty node, and determine that the fourth page in the replica data of the faulty node has a fault.

In one embodiment, the first node may further store the information about the correspondence between the fourth page identifier and the N latest LSNs in a to-be-restored area of the distributed database, so that a management device of the distributed database can detect all faulty nodes and corresponding pages that have a fault. Then, the management device may make a faulty node perform data restoration on a page that is in replica data of the faulty node and that has a fault. For example, the management device may be the cluster manager in FIG. 1.

In addition, if the replica data of the first node has no fault, the first node may further monitor, according to the data log information of the first node, a progress of updating replica data by a node in the N nodes that is not faulty. In one embodiment, the first node determines, according to the information that is about the correspondence between a page identifier and N latest LSNs and that is included in the data log information of the first node, a latest LSN that is corresponding to each page identifier and that is of a node that is not faulty; determines an update operation progress according to a value of the latest LSN; and further predicts a potential faulty node according to the update operation progress of the node that is not faulty.

In this embodiment of this application, the first node may determine, according to the data log information of the first node, a faulty node and a page that is in replica data of the faulty node and that has a fault, thereby improving efficiency in determining a faulty node and determining a page that has a fault. The first node may further monitor an update operation progress of a node that is not faulty, and further predict a potential faulty node.

The foregoing mainly describes the solutions provided in the embodiments of this application from a perspective of the first node. It may be understood that, to implement the foregoing functions, the first node includes corresponding hardware structures and/or software modules for executing the functions. Persons skilled in the art should be easily aware that, in this application, network elements and algorithm steps in examples described with reference to the embodiments disclosed in this specification may be implemented by hardware or a combination of hardware and computer software. Whether a function is executed by hardware or hardware driven by computer software depends on particular applications and design constraint conditions of the technical solutions. Persons skilled in the art may use different methods to implement the described functions for each particular application, but it should not be considered that the implementation goes beyond the scope of this application.

In an embodiment of this application, function modules of the first node may be divided according to the foregoing method examples. For example, the function modules may be correspondingly divided according to the functions, or two or more functions may be integrated in a processing module. The integrated module may be implemented in a form of hardware, or may be implemented in a form of a software function module. It should be noted that module division in this embodiment of this application is merely an example, and is merely logical function division and may be other division in actual implementation.

Figure 8:
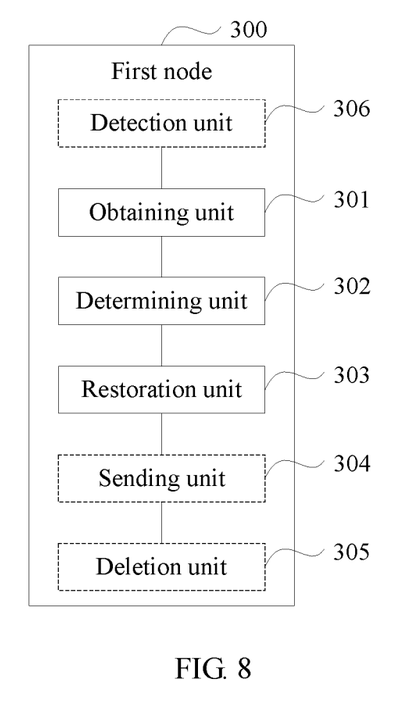
FIG. 8 is a schematic structural diagram of a first node according to an embodiment of this application.

If the function modules are correspondingly divided according to the functions, FIG. 8 shows a schematic diagram of a possible structure of the first node included in the foregoing embodiments. The first node 300 includes an obtaining unit 301, a determining unit 302, and a restoration unit 303. The obtaining unit 301 is configured to perform step 201 in FIG. 3 to FIG. 7, and the process of obtaining the second page in the replica data of the third node in step 206 in FIG. 5 and FIG. 6. The determining unit 302 is configured to perform step 202 in FIG. 3 to FIG. 7, and step 200a and step 200d in FIG. 7. The restoration unit 303 is configured to perform step 203 in FIG. 3 to FIG. 7, step 204 in FIG. 4 and FIG. 5, the process of updating the replica data of the first node in step 206 in FIG. 5 and FIG. 6, and step 200b in FIG. 7. Further, the first node 300 further includes a sending unit 304, configured to perform step 205 in FIG. 4 to FIG. 6. The first node 300 further includes a deletion unit 305, configured to perform step 207 in FIG. 6. The first node 300 further includes a detection unit 306, configured to perform step 200c in FIG. 7. For all related content of the steps included in the foregoing method embodiments, refer to function descriptions of corresponding function modules, and details are not repeated herein.

Figure 9:
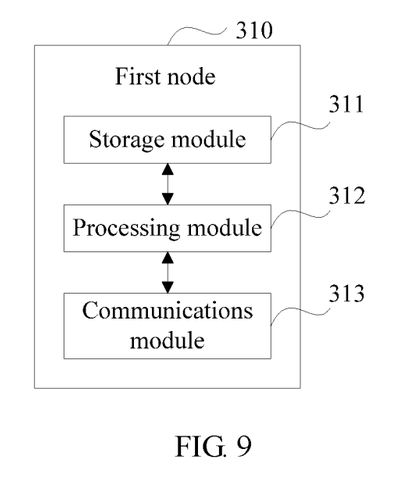
FIG. 9 is a schematic structural diagram of another first node according to an embodiment of this application.

If an integrated module is used, FIG. 9 shows a schematic diagram of a logical structure of a first node 310 included in the foregoing embodiments. The first node 310 includes a processing module 312 and a communications module 313. The processing module 312 is configured to control and manage an action of the first node 310. For example, the processing module 312 is configured to perform step 202 in FIG. 3 to FIG. 7, step 207 in FIG. 6, and step 200b to step 200d in FIG. 7, and/or another process of the technology described in this specification. The communications module 313 is configured to implement communication with the second node or the third node. The first node 310 may further include a storage module 311, configured to store program code and data of the first node 310.

The processing module 312 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 312 may implement or execute various example logical blocks, modules, and circuits described with reference to content disclosed in this application. The processor may alternatively be a combination implementing a computing function. For example, the processor includes a combination of one or more microprocessors, or a combination of a digital signal processor and a microprocessor. The communications module 313 may be a transceiver, a transceiver circuit, a communications interface, or the like. The storage module 311 may be a memory.

Figure 10:
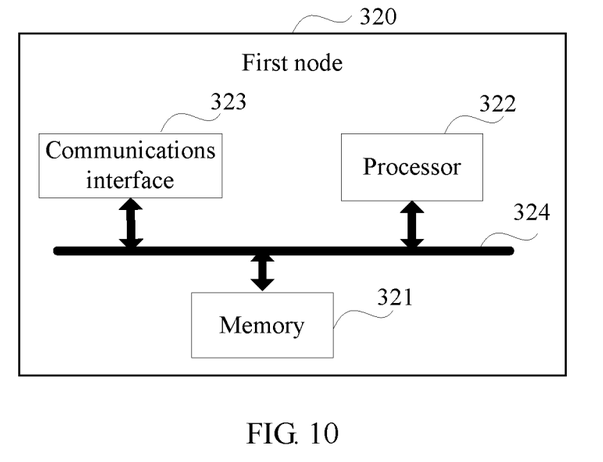
FIG. 10 is a schematic structural diagram of still another first node according to an embodiment of this application.

When the processing module 312 is the processor, the communications module 313 is the communications interface, and the storage module 311 is the memory, the first node included in this embodiment of this application may be a first node shown in FIG. 10.

Referring to FIG. 10, FIG. 10 is an example of a hardware structure of a first node. The first node 320 includes a processor 322, a communications interface 323, a memory 321, and a bus 324. The communications interface 323, the processor 322, and the memory 321 are mutually connected by using the bus 324. The bus 324 may be a peripheral component interconnect (PCI) bus, an extended industry standard architecture (EISA) bus, or the like. The bus may be classified into an address bus, a data bus, a control bus, and the like. For ease of representation, the bus is represented by using only one bold line in FIG. 10, but it does not mean that there is only one bus or one type of bus.

In another embodiment of this application, a computer-non-transitory computer-readable medium is further provided. The computer-non-transitory computer-readable medium stores a computer-executable instruction. When at least one processor of a device executes the computer-executable instruction, the device executes the multi-replica data restoration method shown in any one of FIG. 3 to FIG. 7.

In another embodiment of this application, a computer program product is further provided. The computer program product includes a computer-executable instruction, and the computer-executable instruction is stored in a computer-non-transitory computer-readable medium. At least one processor of a device may read the computer-executable instruction from the computer-non-transitory computer-readable medium, and the at least one processor executes the computer-executable instruction, so that the device implements the multi-replica data restoration method shown in any one of FIG. 3 to FIG. 7.

In another embodiment of this application, a distributed database is further provided. The distributed database includes a first node. The first node is the first node shown in any one of FIG. 8 to FIG. 10. The first node is configured to execute the multi-replica data restoration method shown in any one of FIG. 3 to FIG. 7.

In the distributed database provided in this embodiment of this application, if a first page in replica data of the first node has a fault, the first node may determine a third node according to N latest LSNs in data log information of a second node that are corresponding to a first page identifier, where the second node is not faulty. Replica data of the third node is latest replica data, and the first node performs data restoration on the first page in the replica data of the first node according to the latest replica data, thereby reducing a data restoration time, improving data restoration efficiency, and reducing storage pressure of the database.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method of multi-replica data restoration for a distributed database comprising N nodes, the method comprising:
   when a first page in replica data of a first node in the N nodes has a fault, obtaining, by the first node, N latest log sequence numbers (LSNs) in data log information of a second node that corresponds to a first page identifier, wherein the N latest LSNs are in a one-to-one correspondence to the N nodes, and N is an integer greater than or equal to 2, wherein the first page is any page that is in the replica data of the first node and that has a fault, and the second node is a node in the N nodes that is not faulty;
   determining, by the first node, a third node according to the N latest LSNs in the data log information of the second node that corresponds to the first page identifier, wherein the third node is a node corresponding to a largest LSN in the N latest LSNs; and
   performing, by the first node, data restoration on the first page in the replica data of the first node according to replica data of the third node.

2. The method according to claim 1, further comprising: updating, by the first node, data log information of the first node according to the N latest LSNs in the data log information of the second node that corresponds to the first page identifier.

3. The method according to claim 1, further comprising: sending, by the first node, the restored first page to other faulty nodes different from the first node that are in the N nodes, so that each faulty node of the other faulty nodes updates replica data of the faulty node according to the first page.

4. The method according to claim 1, further comprising: obtaining, by the first node, a second page in the replica data of the third node, and updating the replica data of the first node according to the second page, wherein the second page is any page updated in a fault rectification process of the first page.

5. The method according to claim 1, further comprising:
   when the replica data of the first node has no fault and there are update operations on first pages in replica data of the N nodes, determining, by the first node, the N latest LSNs corresponding to the first page identifier; and
   updating, by the first node, data log information of the first node according to the first page identifier and the N latest LSNs.

6. The method according to claim 1, further comprising:
   when the replica data of the first node has no fault and there is at least one latest LSN corresponding to a fourth page identifier that meets a preset fault condition, determining, by the first node, that a node corresponding to the at least one latest LSN is a faulty node, and a fourth page in replica data of the faulty node has a fault.

7. The method according to claim 6, wherein the preset fault condition comprises: a difference between the at least one latest LSN and another latest LSN in the N latest LSNs corresponding to the fourth page identifier, and a difference between the at least one latest LSN and the other latest LSN being greater than or equal to a preset threshold; or the preset fault condition comprises a quantity of the latest LSNs corresponding to the fourth page identifier is less than N.

8. A first node being one of N nodes comprised in a distributed database, the first node comprising:
   a processor and a memory coupled to the processor and configured to store program code, which when executed by the processor, causes the processor to:
   when a first page in replica data of the first node has a fault, obtain, by the first node, N latest log sequence numbers (LSNs) in data log information of a second node that corresponds to a first page identifier, wherein the N latest LSNs are in a one-to-one correspondence to the N nodes, and N is an integer greater than or equal to 2, wherein the first page is any page that is in the replica data of the first node and that has a fault, and the second node is a node in the N nodes that is not faulty;
   determine a third node according to the N latest LSNs in the data log information of the second node that corresponds to the first page identifier, wherein the third node is a node corresponding to a largest LSN in the N latest LSNs; and
   perform data restoration on the first page in the replica data of the first node according to replica data of the third node.

9. The first node according to claim 8, wherein the program code, which when executed by the processor, further causes the processor to:
   update data log information of the first node according to the N latest LSNs in the data log information of the second node that corresponds to the first page identifier.

10. The first node according to claim 9, wherein the program code, which when executed by the processor, further causes the processor to:
   send the restored first page to other faulty nodes different from the first node that are in the N nodes, so that each faulty node of the other faulty nodes updates replica data of the faulty node according to the first page.

11. The first node according to claim 9, wherein the program code, which when executed by the processor, further causes the processor to:
   obtain a second page in the replica data of the third node; and
   update the replica data of the first node according to the second page, wherein the second page is any page updated in a fault rectification process of the first page.

12. The first node according to claim 9, wherein the program code, which when executed by the processor, further causes the processor to:
   when the replica data of the first node has no fault and there are update operations on first pages in replica data of the N nodes, determine the N latest LSNs corresponding to the first page identifier; and update data log information of the first node according to the first page identifier and the N latest LSNs.

13. The first node according to claim 9, wherein the program code, which when executed by the processor, further causes the processor to:

when the replica data of the first node has no fault and there is at least one latest LSN corresponding to a fourth page identifier that meets a preset fault condition, determine that a node corresponding to the at least one latest LSN is a faulty node, and a fourth page in replica data of the faulty node has a fault.

14. A non-transitory computer-readable medium that stores instructions, and when the medium runs on a first node being one of N nodes in a distributed database, the first node executes a method of multi-replica data restoration, the method comprising:

when a first page in replica data of a first node has a fault, obtaining, by the first node, N latest log sequence numbers (LSNs) in data log information of a second node that corresponds to a first page identifier, wherein the N latest LSNs are in a one-to-one correspondence to the N nodes, and N is an integer greater than or equal to 2, wherein the first page is any page that is in the replica data of the first node and that has a fault, and the second node is a node in the N nodes that is not faulty;

determining, by the first node, a third node according to the N latest LSNs in the data log information of the second node that corresponds to the first page identifier, wherein the third node is a node corresponding to a largest LSN in the N latest LSNs; and performing, by the first node, data restoration on the first page in the replica data of the first node according to replica data of the third node.

15. The non-transitory computer-readable medium according to claim 14, wherein the method further comprises:

updating, by the first node, data log information of the first node according to the N latest LSNs in the data log information of the second node that corresponds to the first page identifier.

16. The non-transitory computer-readable medium according to claim 14, wherein the method further comprises:

sending, by the first node, the restored first page to other faulty nodes different from the first node that are in the N nodes, so that each faulty node of the other faulty nodes updates replica data of the faulty node according to the first page.

17. The non-transitory computer-readable medium according to claim 14, wherein the method further comprises:

obtaining, by the first node, a second page in the replica data of the third node, and updating the replica data of the first node according to the second page, wherein the second page is any page updated in a fault rectification process of the first page.

18. The non-transitory computer-readable medium according to claim 14, wherein the method further comprises:

when the replica data of the first node has no fault and there are update operations on first pages in replica data of the N nodes, determining, by the first node, the N latest LSNs corresponding to the first page identifier; and updating, by the first node, data log information of the first node according to the first page identifier and the N latest LSNs.

19. The non-transitory computer-readable medium according to claim 14, wherein the method further comprises:

when the replica data of the first node has no fault and there is at least one latest LSN corresponding to a fourth page identifier that meets a preset fault condition, determining, by the first node, that a node corresponding to the at least one latest LSN is a faulty node, and a fourth page in replica data of the faulty node has a fault.

20. The non-transitory computer-readable medium according to claim 19, wherein the preset fault condition comprises: a difference between the at least one latest LSN and another latest LSN in the N latest LSNs corresponding to the fourth page identifier, and a difference between the at least one latest LSN and the other latest LSN being greater than or equal to a preset threshold; or the preset fault condition comprises a quantity of the latest LSNs corresponding to the fourth page identifier is less than N.

* * * * *